United States Patent [19]

Kaneda

[11] Patent Number: 5,223,981
[45] Date of Patent: Jun. 29, 1993

[54] LENS POSITION CONTROL DEVICE

[75] Inventor: Naoya Kaneda, Kanagawa, Japan

[73] Assignee: Canon Kabushiki Kaisha, Tokyo, Japan

[21] Appl. No.: 829,905

[22] Filed: Feb. 3, 1992

[30] Foreign Application Priority Data

Feb. 7, 1991 [JP] Japan .................................. 3-016382

[51] Int. Cl.⁵ ............................................. G02B 15/14
[52] U.S. Cl. .................................... 359/698; 359/696; 354/400; 358/227
[58] Field of Search ........................ 359/696, 697, 698; 354/400, 195.12, 402; 358/227

[56] References Cited

U.S. PATENT DOCUMENTS

| | | | |
|---|---|---|---|
| 5,005,956 | 4/1991 | Kaneda et al. | 359/698 |
| 5,027,147 | 6/1991 | Kaneda | 354/400 |
| 5,060,001 | 10/1991 | Kaneda | 354/400 |

*Primary Examiner*—Loha Ben
*Attorney, Agent, or Firm*—Robin, Blecker, Daley & Driscoll

[57] ABSTRACT

An optical apparatus comprises a first lens arranged to be movable along an optical axis for a power varying action; a second lens arranged to be movable also along the optical axis for focusing and also for compensation during the power varying action, position detecting circuits for detecting the positions of the first and second lenses, a focus detecting circuit, and a control circuit for controlling the movement of the second lens on the basis of information obtained from the position detecting circuits and the focus detecting circuit when the power varying action is performed, the control circuit being arranged to vary a manner of control over the movement of the second lens according to whether or not the power varying action is in process in a case where the second lens is to be forcibly moved while the focus detecting circuit is inoperative.

18 Claims, 10 Drawing Sheets

LENS POSITION CONTROL DEVICE

BACKGROUND OF THE INVENTION

1. Field of the Invention

This invention relates to a lens position control device adapted for optical apparatuses such as video cameras, silver-salt cameras and interchangeable lenses.

2. Description of the Related Art

Among the photo-taking zoom lenses of the varied kinds generally employed for a video camera or the like, a "front-lens focus type" zoom lens is most popular. In the front-lens focus type zoom lens, a first lens group is used as a focus lens for adjusting focus; a second lens group is used as a variator lens for varying the power of the zoom lens; a third lens group is used as a compensator lens for keeping the image forming position of the zoom lens constant even when a power varying action is performed; and a fourth lens group is used as a relay lens for forming an image.

The positional relation between the variator lens and the compensator lens of the front-lens focus type zoom lens is preset and unvarying irrespectively of the position of the front lens, i.e., the focusing distance. In most cases, therefore, the variator lens and the compensator lens are interlocked by means of a mechanical part called a cam ring.

Figure 7:
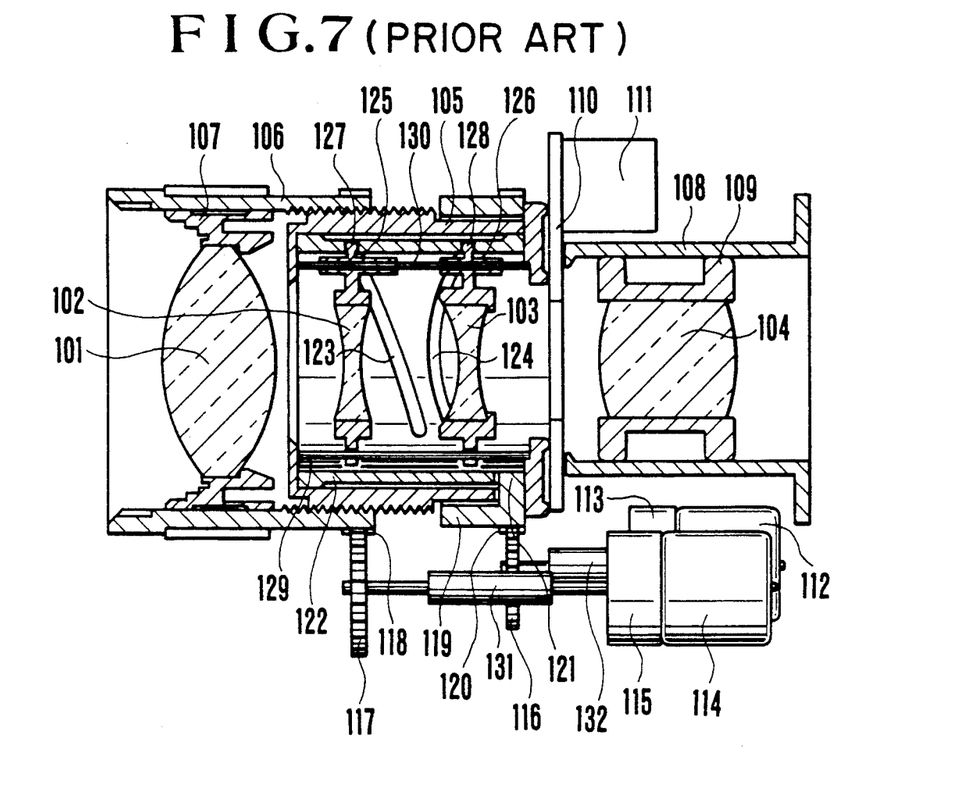
FIG. 7 is a sectional view showing by way of example a first example of the conventional device.

FIG. 7 of the accompanying drawings shows the arrangement of the front-lens focus type zoom lens which is generally employed. Referring to FIG. 7, the zoom lens consists of a focus lens 101 which is a first lens group; a variator lens 102; a compensator lens 103; and a relay lens 104. These lenses respectively have the above-stated functions. The illustration includes a fixed tube 105; a female helicoid 106; a front-lens tube 107; a relay holder 108; a relay tube 109; a diaphragm blade unit 110; an aperture meter 111; a zoom motor 112; a gear head part 113 for the zoom motor 112; a focus motor 114; a gear head part 115 for the focus motor 114; an output gear 116 of the zoom motor 112; an output gear 117 of the focus motor 114; a gear part 118 formed on the female helicoid 106 in one body with the latter; a zoom ring 119; a gear part 120 formed on the zoom ring 119 in one body with the latter; a projection 121 arranged to transmit the rotation of the zoom ring 119 to a cam ring 122; the cam ring 122; a cam slot 123 provided in the cam ring 122 for the variator lens 102; a cam slot 124 for the compensator lens 103; a variator-lens moving ring 125; a compensator-lens moving ring 126; a cam follower part 127 formed in one body with the variator-lens moving ring 125; a cam follower part 128 formed in one body with the compensator-lens moving ring 126; guide bars 129 and 130 of the moving rings 125 and 126; a focus-motor slip unit 131; and a zoom-motor slip unit 132.

Figure 8:
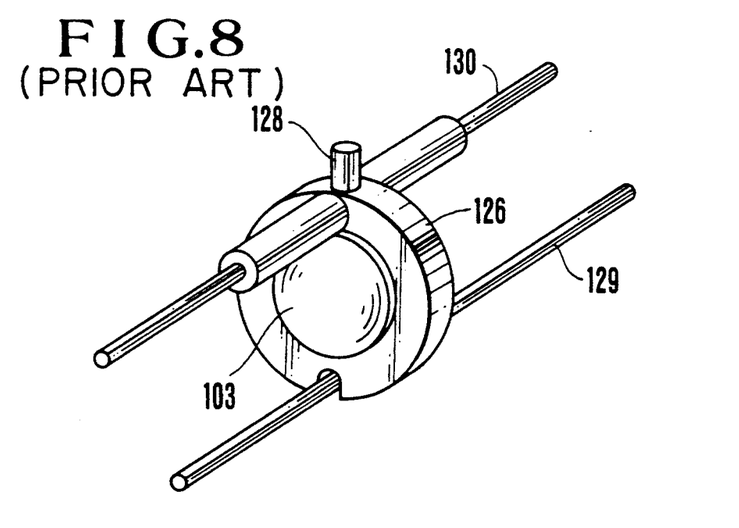
FIG. 8 is an oblique view showing the essential parts of FIG. 7.

FIG. 8 is an oblique view mainly showing the compensator lens part. In FIG. 8, the same reference numerals as those of FIG. 7 indicate the same parts.

The front-lens focus type zoom lens having the above-stated parts performs the following actions:

FOCUSING ACTION: The focus lens 101 is secured to the front-lens tube 107 by heat caulking or the like. The periphery of the front-lens tube 107 is fitted into the inner side of the female helicoid 106 without any play and is fixed in position by some adhesive or the like after adjustment of its position in the direction of an optical axis. The female helicoid 106 is screw-fitted by a helicoid screw on the fixed tube 105 in its rear part. The focus lens 101 is thus arranged to be movable in the direction of the optical axis by rotating the female helicoid 106. Further, the output gear 117 of the focus motor is interlocked with the gear part 118 of the rear end part of the female helicoid 106. Upon receipt of a driving instruction from an automatic focusing device or the like which is not shown, the focus motor 114 rotates. The rotation of the focus motor 114 is moderated by the gear head part 115 to cause the focus lens 101 to move via the slip unit 131. In the case of manual focusing, the female helicoid 106 is operated by the operator. In this case, the gear provided within the gear head part 115 is prevented from being damaged by the operation as the slip torque of the slip unit 131 is set at such a value that prevents such damage.

ZOOM ACTION: In the front-lens focus type zoom lens, the variator lens 102 and the compensator lens 103 must be interlocked to be constantly in a given positional relation. To maintain this positional relation, the cam ring 122 is provided with the cam slot 123 for the variator lens 102 and the cam slot 124 for the compensator lens 103. Two guide bars 129 and 130 which are arranged as shown in FIG. 8 are used for guiding the variator lens 102 and the compensator lens 103 in the direction of the optical axis. In the case of FIG. 8, a sleeve part which is in one body with the compensator-lens moving ring 126 is fitted on the bar 130. The bar 129 serves as a rotation stopper. The cam follower part 128 engages the cam slot 124. The variator lens 102 and the compensator lens 103 are thus arranged to move in association with each other when the cam ring 122 is rotated. The outer circumferential face of the cam ring 122 and the inner circumferential face of the fixed tube 105 are fittingly engaged in such a dimensional relation as to be turnable by a slight torque without rattling. The cam ring 122 is located on the inner side of the fixed tube 105. The cam ring 122 must be rotated in response to a rotating operation performed on the zoom ring 119 by the operator. For this purpose, the projection 121 is provided at the rear end of the zoom ring 119 for interlocking the zoom ring 119 with the cam ring 122.

Therefore, the fixed tube 105 is provided with a slot which extends over the turning range of the projection 121, covering the rotation angle of the zoom ring 119 between the telephoto and wide-angle end positions of the zoom ring 119. The zoom ring 119 and the zoom motor 112 are thus interlocked in the same manner as the female helicoid 106 and the focus motor 114.

The most typical arrangement of the conventional front-lens focus type zoom lens is as described above. In the case of the front-lens focus type zoom lens, the front lens part is arranged to be drawn out accordingly as the focusing distance becomes nearer. The amount of drawing out the lens tends to increase in proportion to the reciprocal number of the distance. Therefore, the nearest shootable distance with the front-lens focus type zoom lens is about one meter in general.

Meanwhile, zoom lenses called inner focus type or rear focus type zoom lenses have been known. The zoom lens of this type is arranged to perform a focusing action by using a lens group which is disposed more rearward than the variator lens. Such zoom lenses have already been manufactured and marketed. The inner focus type zoom lens permits shooting at a nearer distance than the front-lens focus type zoom lens and is arranged to permit, on the wide-angle side thereof, continuous focusing on objects located at distances from a point immediately before the lens to an infinitely distant point.

Figure 9:
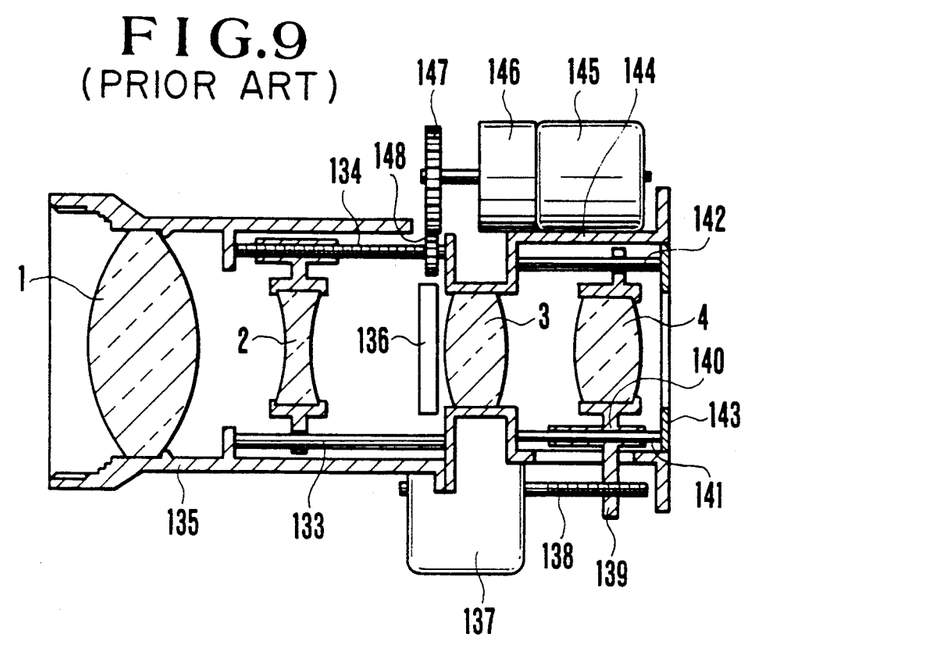
FIG. 9 is a sectional view showing a second example of the conventional device.

FIG. 9 shows by way of example the arrangement of one of the various zoom lenses of the inner/focus type which uses the rearmost lens group for focusing. Referring to FIG. 9, this zoom lens consists of a fixed front lens 1; a variator lens 2 for varying the lens power; a fixed lens 3 used as a relay lens group; and a focus lens 4. A guide bar 133 serves as a whirl-stop. A reference numeral 134 denotes a variator-lens feeding bar. A numeral 135 denotes a fixed tube. A numeral 136 denotes a diaphragm unit, which is assumed to have been inserted perpendicularly to the paper surface of the drawing. A stepping motor 137 is employed as a focus motor. The stepping motor 137 has an output shaft 138 which is threaded for lens feeding. This lens-feed screw part of the output shaft 138 engages a female screw part 139 which is formed in one body with a moving frame 140 of the focus lens 4. Guide bars 141 and 142 are arranged to guide the lens moving frame 140. A back plate 143 is arranged to position and retain the guide bars 141 and 142 in place. The illustration includes: a relay holder 144; a zoom motor 145; a zoom-motor speed reduction gear unit 146; and interlocking gears 147 and 148. The gear 148 is secured to the variator-lens feeding bar 134.

With the zoom lens arranged in the above-stated manner, when the stepping motor 137 is driven, the focus lens 4 is moved by screw feeding in the direction of the optical axis. Further, when the zoom motor 145 is driven, the gears 147 and 148 move to rotate the variator-lens feeding bar 134. The rotation of the feeding bar 134 causes the variator lens 2 to move in the direction of the optical axis.

Figure 10:
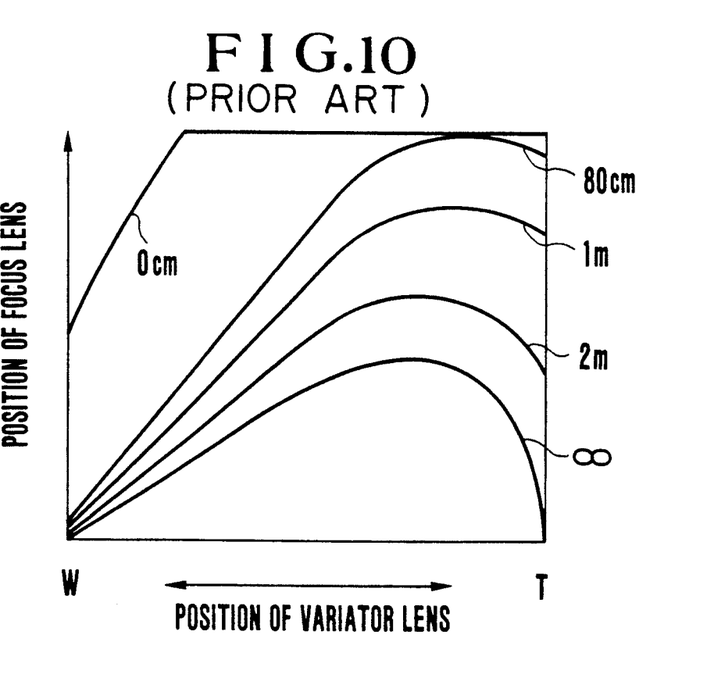
FIG. 10 is a graph showing the positional relation between lens groups.

FIG. 10 shows the positional relations between the variator lens and the focus lens obtained in the above-stated zoom lens for various object distances. In this instance, the positional relations are shown by way of example as obtained with the lens focused on objects located at distances including an infinity distance, 2 m, 1 m, 80 cm and 0 cm. As shown, in the case of the inner focus type zoom lens, the positional relation between the variator lens and the focus lens varies according to the object distance. Compared with the cam ring arrangement of the front-lens focus type zoom lens, therefore, the lens groups of the inner focus type zoom lens cannot be interlocked by a simple mechanical arrangement. If the lens of the structural arrangement as shown in FIG. 9 is arranged to be simply operated by driving the zoom motor 145, the image of the object would then be blurred.

The above-stated characteristic has delayed the practicalization of the inner focus type zoom lens despite its advantages over the front-lens focus type zoom lens, including: its excellent ability in respect of nearest distance shooting; a fewer number of component lenses required; and a simpler mechanical arrangement.

During recent years, however, techniques for performing optimum control over a positional relation between the component lenses according to the object distance as shown in FIG. 10 have been developed and practicalized. For example, a method for tracing the positional relation between two lenses 2 and 4 according to the object distance has been proposed as disclosed in U.S. Pat. No. 4,920,369.

Figure 11:
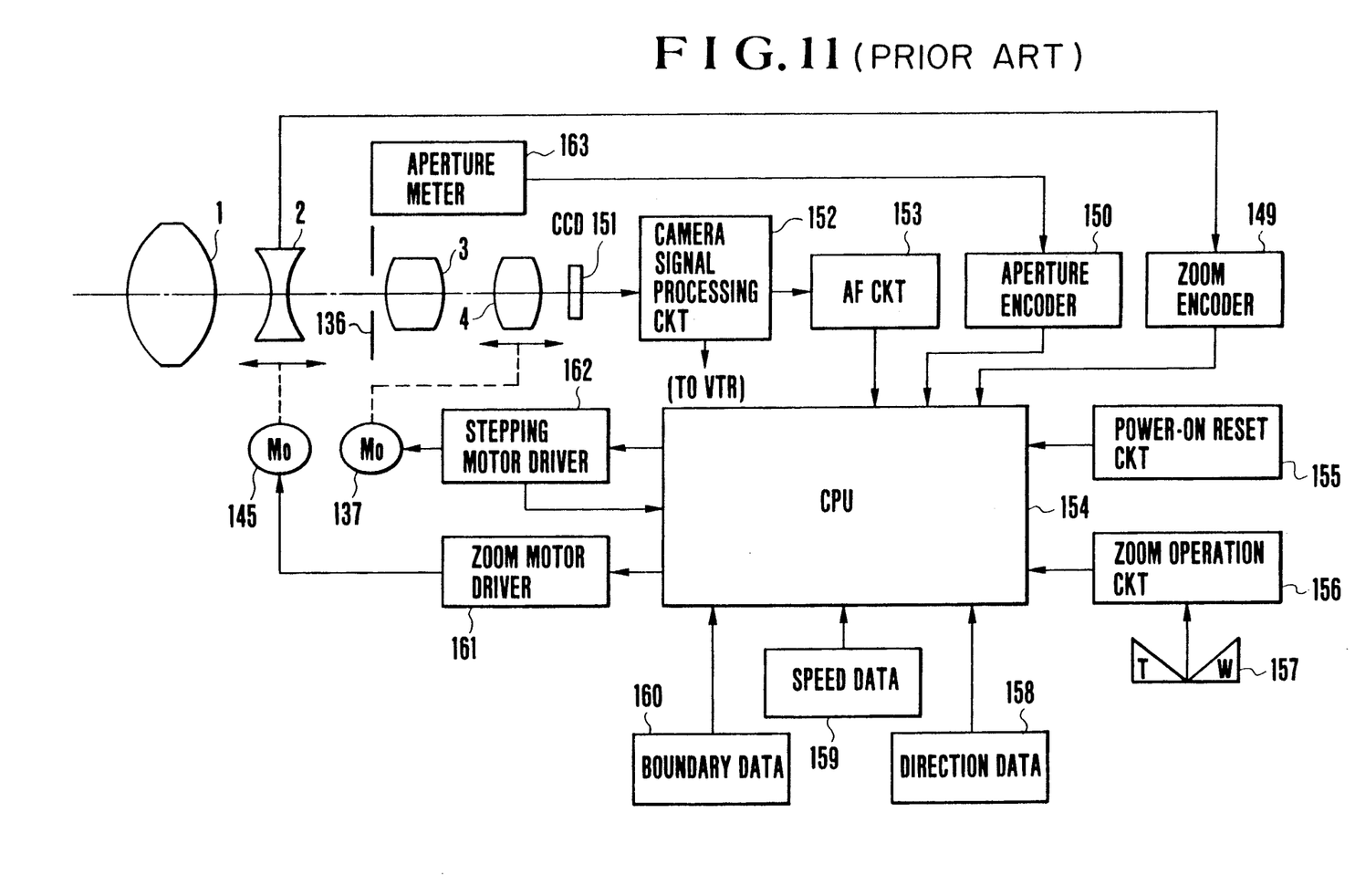
FIG. 11 is a block diagram showing the actions of a lens system shown in FIG. 9.
Figure 12:
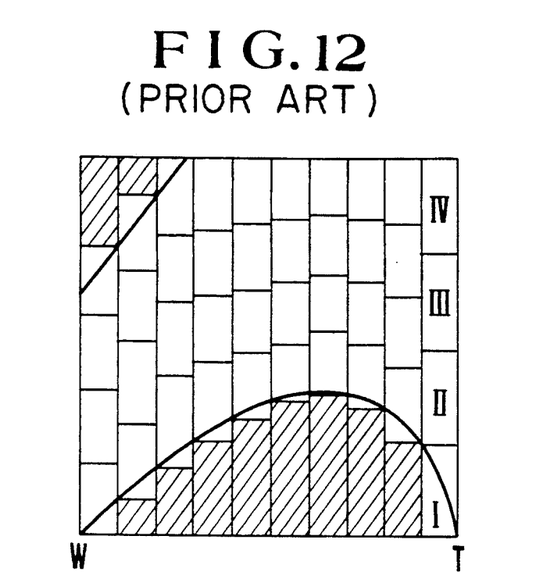
FIG. 12 is a map view showing lens positions.
Figure 13:
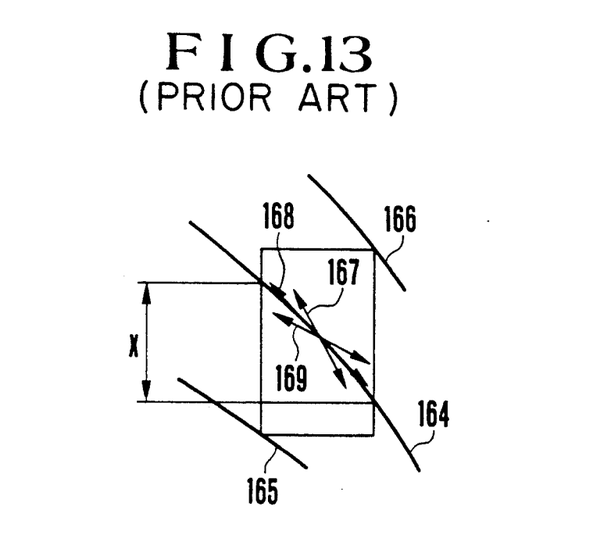
FIG. 13 is an enlarged view of one area shown in FIG. 12.

The above-stated method is as shown in FIGS. 11, 12 and 13. The positional relation between the variator lens and the focus lens can be maintained by this method. FIG. 11 shows in a block diagram an arrangement for carrying out the method. In FIG. 11, reference numerals 1 to 4 denote the same lens groups as those shown in FIG. 9. The position of the variator lens 2 is detected by a zoom encoder 149. The zoom encoder 149 may be arranged as a volume encoder, for example, to have a brush mounted on a variator-lens moving ring in one body therewith and to allow the brush to slide over a circuit board on which a resistance pattern is printed. An aperture encoder 150 is arranged to detect an aperture value by using, for example, the output of a Hall element which is disposed within an aperture meter 163. An image sensor 151 is a CCD or the like. A camera signal processing circuit 152 supplies a luminance signal Y to an AF (automatic focusing) circuit 153. The AF circuit 153 makes a discrimination between an in-focus state and a defocus state. In the event of defocus, the defocus state is determined to be a near-focus or far-focus state and the amount of defocus is also determined. The result of these processes are taken into a CPU 154. A power-on reset circuit 155 is arranged to perform reset actions when a power supply is switched on. A zoom operation circuit 156 is arranged to transmit to the CPU 154 information about an operation performed by the operator on a zoom switch 157. Memory parts store the data of loci shown in FIG. 10, including information data 158, speed data 159 and boundary data 160. A zoom motor driver 161 is arranged to drive a zoom motor 145. A stepping motor driver 162 is arranged to drive a stepping (focus) motor 137. The number of pulses inputted to the stepping motor 137 is continuously counted and supplied to the CPU 154. The stepping motor driver 162 is thus used as an encoder for the absolute position of the focus lens 4. In this arrangement, the position of the variator lens 2 and that of the focus lens 4 are thus respectively obtained through the zoom encoder 149 and the numbers of input pulses applied to the stepping motor 137. Therefore, one point can be decided on a map which is shown in FIG. 10.

Meanwhile, the map shown in FIG. 10 is divided into strip-like small areas I, II, III,—as shown in FIG. 12. In FIG. 12, hatched parts indicate areas where lens allocation is inhibited. With one point decided on the map, it is possible to determine one of the small areas to which the point belongs. In each of the speed data and the direction data, the speed and direction of rotation of the stepping motor obtained by the locus passing the center of each area are stored for every area. For example, in the case of FIG. 12, the position of the variator lens on the axis of abscissa is divided into ten zones. Assuming that the speed of the zoom motor is set at such a value as to move the variator lens between a telephoto end position and a wide-angle position in ten sec, the variator lens passes one zone in one sec when it is moved in the direction of zooming. FIG. 13 is an enlarged view of a block III shown in FIG. 12. A locus 164 passes the middle part of the block III. A locus 165 passes a lower left point. A locus 166 passes an upper right point. The angles of inclination of these loci differ somewhat from one another. However, with respect to the middle locus 164, the locus can be traced without much error, if the focus lens moves at a speed of X mm/sec.

The speed obtained as mentioned above is called an "area representative speed". In the memory for the speed data, the value of the area representative speed is stored for every one of the small areas. Further, assuming that this speed is indicated as 168, the speed of the stepping motor 137 is set by finely adjusting the representative speed to 167 or to 169 according to the result of detection made by an AF (automatic focusing) action. Further, with respect to the direction data, the rotating direction of the stepping motor varies according to the direction of zooming from a telephoto end position T to a wide-angle end position W or from the position W to the position T. Therefore, the data of signs indicating these directions are stored in the memory of the direction data.

The speed of the stepping motor 137 is thus set by correcting the area representative speed according to the result of (focus) detection made by the AF circuit. Then, by using the stepping-motor speed thus obtained, the position of the focus lens is controlled by driving the stepping motor during a zooming action. With the focus lens position controlled in this manner, it is possible to prevent any blurred state from taking place during the process of zooming, even if the zoom lens is of the inner focus type. The cam tracing method which is described above is called an electronic cam.

In another known method, the speeds 167 and 169 shown in FIG. 13 are stored in the memory in addition to the representative speed 168, and one of the three speeds is selected according to the result of distance measurement made by the AF circuit.

The method for controlling the lens position of the inner focus type zoom lens during the process of zooming has been described above in comparison with the front-lens focus type zoom lens. In the case of the description given above with reference to FIGS. 11, 12 and 13, the operation of the device is performed while the AF device is on. However, even when the AF device is off, the lens can be kept focused on one and the same object throughout a zooming action performed solely at the area representative speeds from the telephoto end position T to the wide-angle end position W or from the position W to the position T by reversely tracing the passing points after the zoom lens is first brought into an in-focus state in the telephoto end position. In another known method which is disclosed in Japanese Laid-Open Patent Application No. HEI 1-32146, points on the loci are stored beforehand, instead of storing the speed data in the manner as described in the foregoing.

However, in the case of manual focusing operation on such an inner focus type zoom lens, it is very difficult to change the position of the focus lens without rotating the motor as shown in FIG. 7. The reasons for the difficulty include among others the following points:

(1) The focus lens is disposed in the rear part of the zoom lens and is located closer to the inside of the camera. Therefore, the focus lens does not leave a sufficient interlocking space. (2) Since the moving ring is fitted by screwing directly on the output shaft of the stepping motor, it is difficult to form a slip unit. (3) The absolute position encoder fails to operate if the lens position is not changed by driving the stepping motor.

Therefore, the manual focusing operation on the inner focus type zoom lens has been performed by allowing the focus motor to rotate in one direction in accordance with a switch operation, in a manner called "power focusing". Switch arrangement used for this purpose includes two different types. In one type: Two push switches are simply arranged to designate the driving direction of the focus motor. In the other type: An operation ring is arranged, in the same manner as in the case of the conventional front-lens focus type zoom lens, to designate the direction and the speed of driving of the focus motor on the basis of the direction and speed of rotation of this operation ring.

In actuality, however, little heed is given to any action that is to be performed when a manual focusing operation is performed during the process of zooming. In other words, when a manual focusing operation is performed during the process of zooming even while the AF device is off, the focus motor is already driving the lens for tracing the locus. Besides, the speed and direction of the driving action vary according to the area. Therefore, with an instruction given by operating a manual focusing button to cause the motor to rotate either clockwise CW or counterclockwise CCW at a certain speed, if the instruction is accepted, a greatly blurred state would take place in a very short period of time. Further, in such a case, a faulty action tends to be performed to increase the blur even if a button by which the focus is to be shifted toward the infinity distance is pushed or a ring is operated toward an infinity distance position, or even if a button by which the focus is to be shifted toward the nearest distance is pushed, or a ring is operated toward the nearest distance position. To avoid such a faulty action, it has been generally inhibited to accept any manual focusing operation that is performed during the process of zooming while the AF device is off.

SUMMARY OF THE INVENTION

It is a general object of this invention to provide a lens position control device for an inner focus type lens optical system wherein, in moving a lens which performs focusing and also makes correction relative to a power varying action while focus detecting means is inoperative, a manner in which the lens is driven is changed by the device according to whether or not the optical system is in the process of zooming, so that the focusing action can be accomplished in the correct direction even during the process of zooming.

The above and other objects and features of this invention will become apparent from the following detailed description of embodiments thereof taken in connection with the accompanying drawings.

BRIEF DESCRIPTION OF THE DRAWINGS

The contents of FIGS. 7-13 are prior art background to the subject invention, involving conventional devices.

DETAILED DESCRIPTION OF THE PREFERRED EMBODIMENTS

This invention can be put into practice in various manners. The following describes three of the possible embodiments. These embodiments are arranged to operate in the following different manners when a manual focusing operation is performed during the process of zooming while an automatic focusing (AF) device is in an inoperative state (AF off), (1) A signal which is the same as a signal generated when a near-focus or far-focus state is obtained as a result of automatic focusing (AF) is forcibly generated according to the direction in which the manual focusing operation is performed. (2) A given value is either added to or subtracted from an applicable area representative speed according to the direction in which the manual focusing operation is performed. (3) A given value is either added to or subtracted from a focus encoder value according to the direction in which the manual focusing operation is performed.

Figure 1:
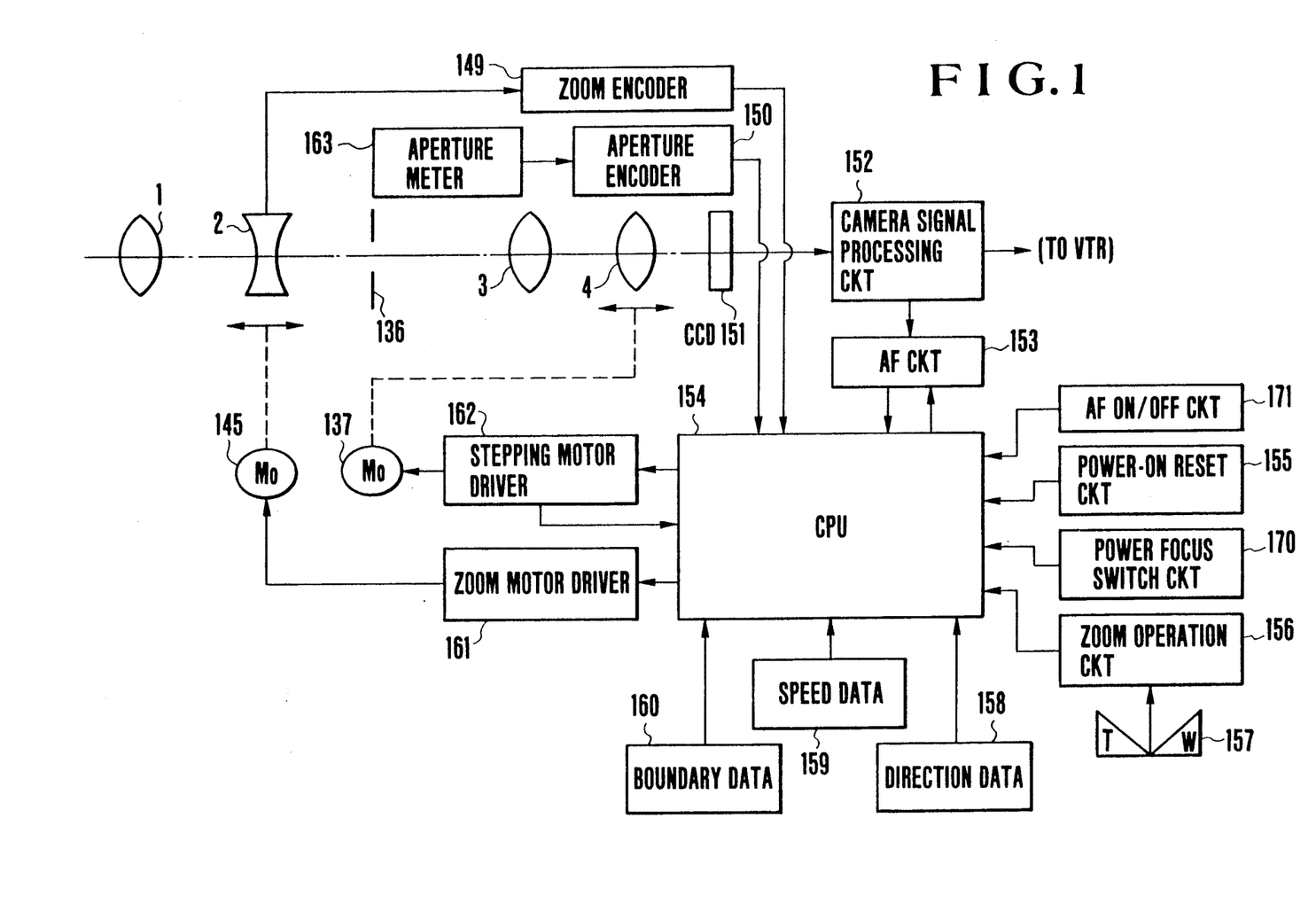
FIG. 1 is a block diagram showing the arrangement of an embodiment of this invention.

The details of the above-stated embodiments of this invention are as described below:

FIG. 1 shows in a block diagram the arrangement of the embodiment of the invention. In FIG. 1, the same components parts as those of the conventional device shown in FIG. 11 are indicated by the same reference numerals. In addition to the signals supplied to the CPU 154 of the conventional device, the CPU 154 of the embodiment shown in FIG. 1 is arranged to receive the output of an AF on/off circuit 171 and that of a power focus switch circuit 170. It is rather generally practiced to have these information signals supplied to the CPU 154. According to the conventional arrangement, for example: When the AF device is off, the lens is controlled by fixing the working speed only to an area representative speed such as the speed 168 shown in FIG. 13 which is employed as standard speed data. Or, when the power focus switch is operated, the CPU 154 instructs the stepping motor driver 162 to drive the motor at a given speed in the given direction. Or, when the power focus switch is operated during the process of zooming while the AF device is off, the operation of the power focus switch is ignored and the focus lens is caused to move at the area representative speed. Whereas, in the case of the embodiment of this invention, the CPU 154 is arranged to function differently from the conventional CPU and operates as shown in FIG. 2 which is a flow chart.

Figure 2:
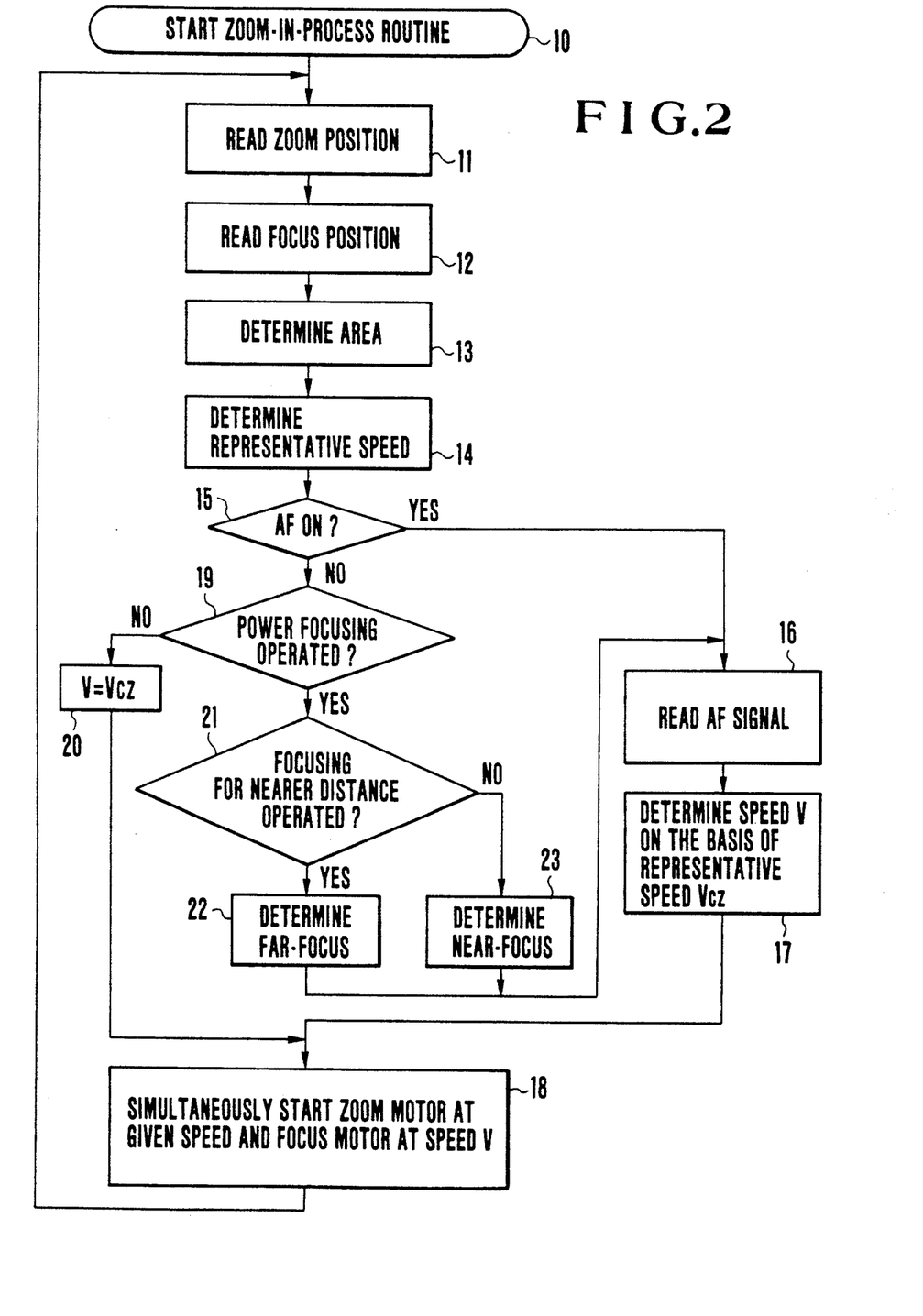
FIG. 2 is a flow chart showing the operation of a first embodiment of the invention.

FIG. 2 shows a first embodiment of this invention in a flow chart. The flow chart represents a "zoom-in-process routine" to be executed when the zoom switch is operated. The zoom-in-process routine starts at a step 10. At steps 11 and 12: The position of the variator lens 2 is read from the zoom encoder 149. The position of the focus lens 4 is read, for example, through the number of pulses applied to the stepping motor 137. At a step 13: The area in which the positional relation of the two (focus and variator) lenses is currently obtained among the areas I, II, III,—as shown in FIG. 12 is determined. At a step 14: The area representative speeds stored for every one of the areas (the speed 168 shown in FIG. 13) is selected. At a step 15: A check is made for the current state of the AF device. If the AF device is found to be on, the flow comes to a step 16. At the step 16: The current focused state is read from the AF device to find if it is an in-focus state or a defocus state. In the event of a defocus (or blurred) state, a discrimination is made between a near-focus state and a far-focus state and the amount of blur is determined. At a step 17: A speed V at which the lens is to be driven is decided by modifying, on the basis of the results of focus determination, a representative speed Vcz which is read out at the step 14.

If the AF device is found to be off at the step 15, the flow of operation comes to a step 19. At the step 19: A check is made for a power focusing operation (by means of a switch or an operation ring). If the power focusing operation is not performed, the flow comes to a step 20. At the step 20: The driving speed V of the stepping motor 137 is set at the representative speed Vcz. If the power focusing operation is performed, the flow comes to a step 21. At the step 21: A check is made to find if the power focusing operation is performed for a nearer distance, i.e., in the direction of drawing the lens out, or in the direction opposite to it. The flow comes to a step 22 or to a step 23 according to the direction thus found. At the step 22 or 23: A signal equivalent to a signal to be generated when a near-focus state or a far-focus state is determined by the AF device is formed.

The functions of the steps 16 and 17 are as follows: Even if the AF device is off, a near-focus or far-focus AF signal is spuriously formed according to the direction of the power focusing operation. Then, at the step 17, the speed of the stepping motor 137 according to which the focus during the process of zooming is shifted in the direction of far-focus or near-focus can be set according to the spurious AF signal. Further, in this instance, the "amount of blur" either may be fixedly set at a value, or a spurious signal may be generated indicating a blurred state which increases accordingly as the rotation speed of an operation ring increases.

At a step 18: With the working (or driving) speed V set in the above-stated manner, the focus motor is started almost at the same time as the zoom motor. The arrangement described enables the embodiment to adjust the movement of the focus lens in the direction of obtaining a desired blurred state even during the process of zooming.

Figure 3:
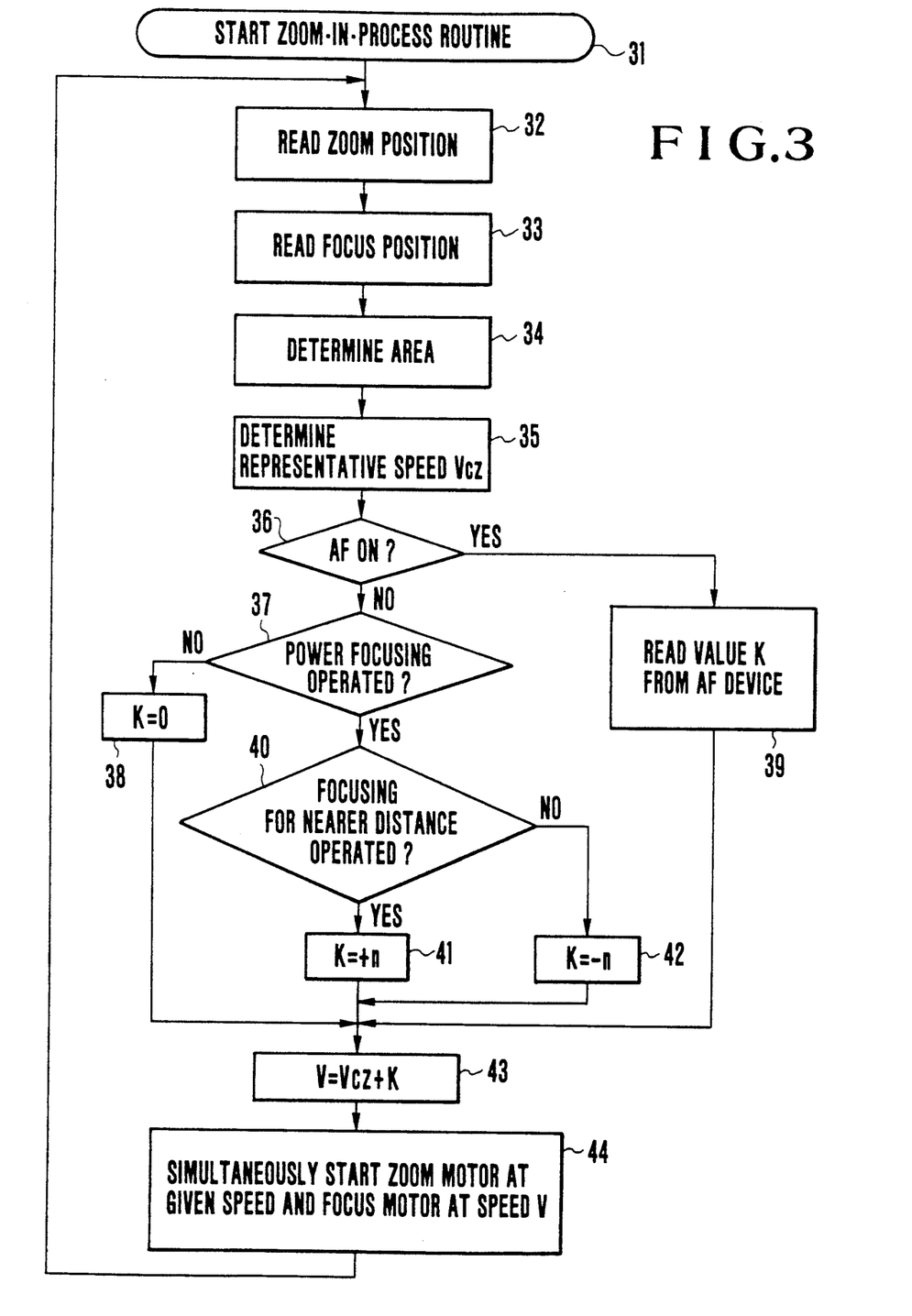
FIG. 3 is a flow chart showing the operation of a second embodiment of the invention.

Next, a second embodiment of the invention is described with reference to FIG. 3 as follows: In the case of the second embodiment shown in FIG. 3, the invention is applied to a system which is arranged to show the result of the focus detecting action of the AF device in the form of a speed correction value K relative to a standard speed. For example, the system may be arranged to decide the working (driving) speed of the focus (stepping) motor by judging the result of the focus detecting action of the AF device on the basis of a fuzzy inference. In FIG. 3, steps 31 to 37 are identical with the steps 10 to 15 and 19 of the first embodiment shown in FIG. 2. If the AF device is found to be on at the step 36, the flow comes to a step 39. At the step 39: The above-stated speed correction value K which is an output of the AF device is read out from the AF device. If the AF device is found to be off and the power focusing operation is not allowed, the flow comes to a step 38. At the step 38: The speed correction value K is set at "O". This means that the focus lens is moved according to the area representative speed. Further, with a check made for the power focusing operation at the step 37 and with a check made for the direction of the power focusing operation at a step 40, the flow comes to a step 41 or to a step 42 according to the direction of the power focusing operation. At this step, the content of the speed correction value K is determined according to the direction of the power focusing operation. At a step 43: The speed correction value K and the area representative speed Vcz are added together to determine the speed V. At a step 44: Both the focus and zoom motors are simultaneously started.

Figure 4:
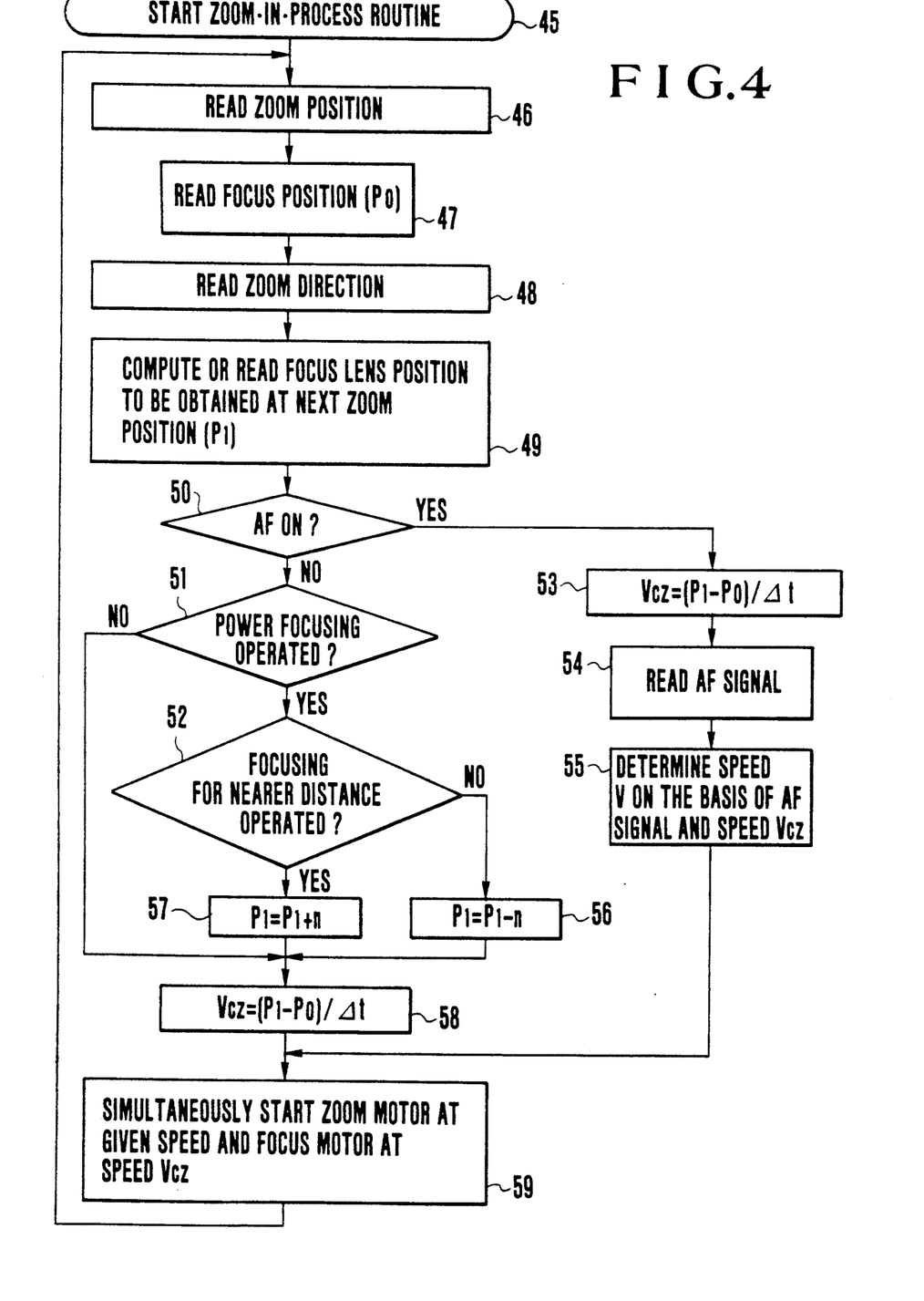
FIG. 4 is a flow chart showing the operation of a third embodiment of the invention.

FIG. 4 shows in a flow chart the operation of a third embodiment. In the case of the third embodiment, the invention is applied to a method, wherein: Unlike the first and second embodiments described above, data of positions to be taken by the focus lens are stored in a position memory as data for various zoom positions according to various object distances. The lens position control is performed by obtaining the points to be traced. The routine starts at a step 45. At a step 46: The position of the variator lens, i.e., a zoom position, is read. At a step 47: The position P0 of the focus lens is read. At a step 48: The direction of zooming is read. When the variator lens is moved in zooming, the next position of the variator lens is determined at the above-stated position memory according to the information obtained at the steps 46, 47 and 48. Then, a next position P1 to be taken by the focus lens at the next zoom position of the variator lens is read out from the data stored at the position memory. Further, in a case where data is arranged in the form of formulas, the position P1 of the focus lens is obtained by computation.

At a step 50: A check is made for the state of the AF device. If the AF device is found to be on, the flow comes to a step 53. At the step 53: A speed Vcz which is expressed as $Vcz=(P1-P0)/\Delta t$ is computed on the basis of a period of time $\Delta t$ required for passing a distance between adjacent zoom detecting positions. Steps 54 and 55 correspond to the steps 16 and 17 shown in FIG. 2. At a step 51: A check is made to find if a power focusing operation is performed. If so, the flow comes to a step 52 to make a check for the direction of the power focusing operation. The flow comes to a step 57 or 56 according to the result of the check. At the step 57 or 56: A correction term "n" is added to or subtracted from the value of the position P1 of the focus lens. At a step 58: In computing the speed Vcz, the value obtained by the correction made at the step 57 or 56 is determined to be the speed Vcz at which the focus motor is to be driven.

The above-stated routine is arranged to compute the lens moving speed by using the position data. However, it goes without saying that a feedback arrangement using, for example, a difference $\Delta P=P1'-P1$ between the focus lens position P1' obtained at a variator lens position actually passed and the focus lens position P1 set in computing the speed may be used for correction to be made in computing the speed next time.

Figure 5:
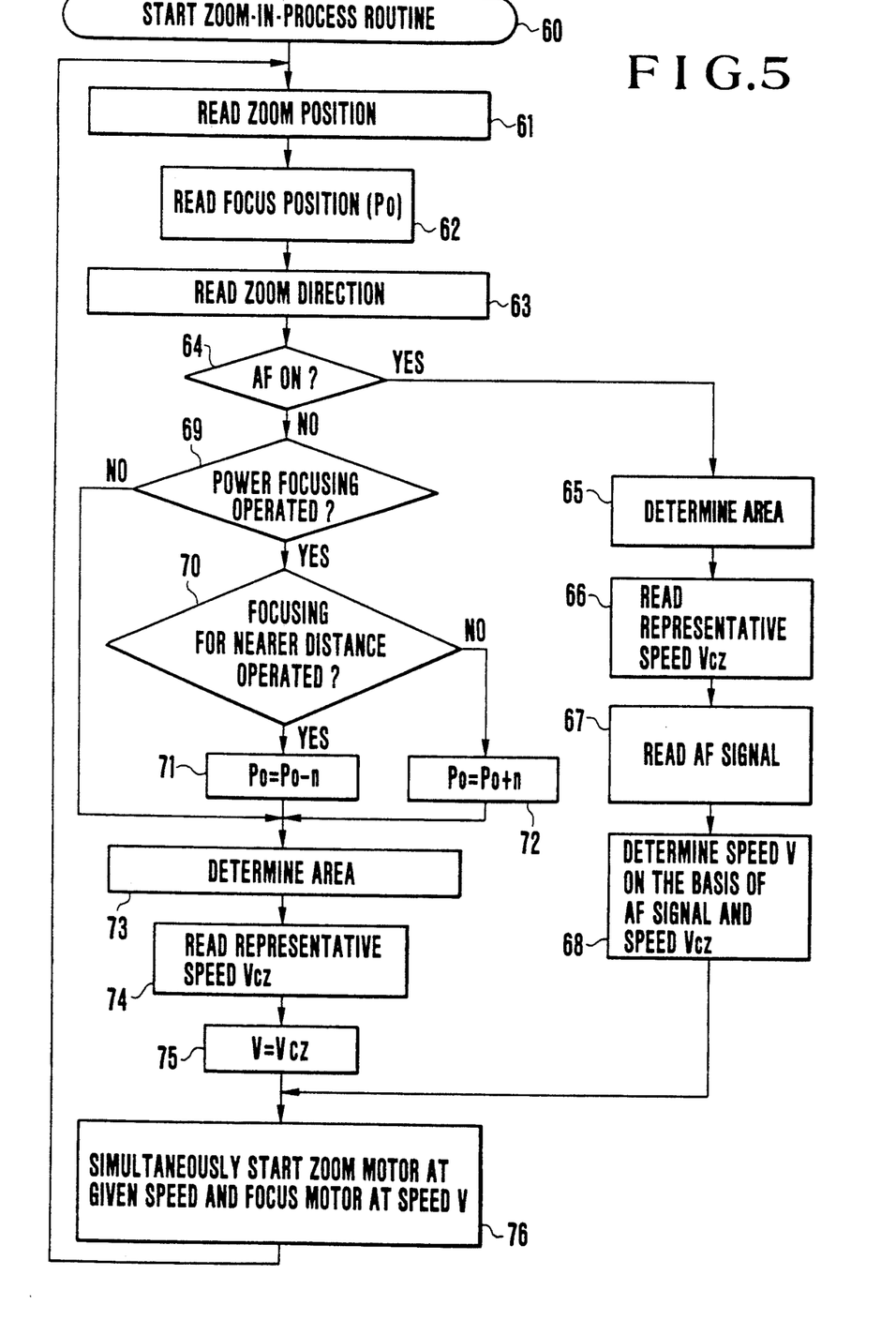
FIG. 5 is a flow chart showing the operation of a fourth embodiment of the invention.

FIG. 5 shows a fourth embodiment in a flow chart. In the case of the fourth embodiment, a value "n" is added to or subtracted from the result of detection of a focus position. The focus position is shifted upward or downward in the areas I, II, III,—shown in FIG. 12. As a result, the representative speed stored in the memory is changed from a speed corresponding to the speed 168 of FIG. 13 to a speed corresponding to the speed 167 or 169 which is as shown also in FIG. 13.

In FIG. 5, steps 60 to 70 are similar to the steps described in the foregoing. However, at steps 71 and 72: The focus lens position P0 is corrected according to the result of the above-stated detection. In this instance, the value "n" is set in such a way as to shift the area to be set by this correction upward or downward. At a step 73: An area is determined on the basis of the corrected focus lens position P0 and the variator lens position. At a step 74: The area representative speed Vcz is read out. At a step 75: The driving speed V of the stepping motor is set at the speed Vcz. At a step 76: Both the zoom and focus motors are simultaneously started in the same manner as in the cases of the first, second and third embodiments.

Figure 6:
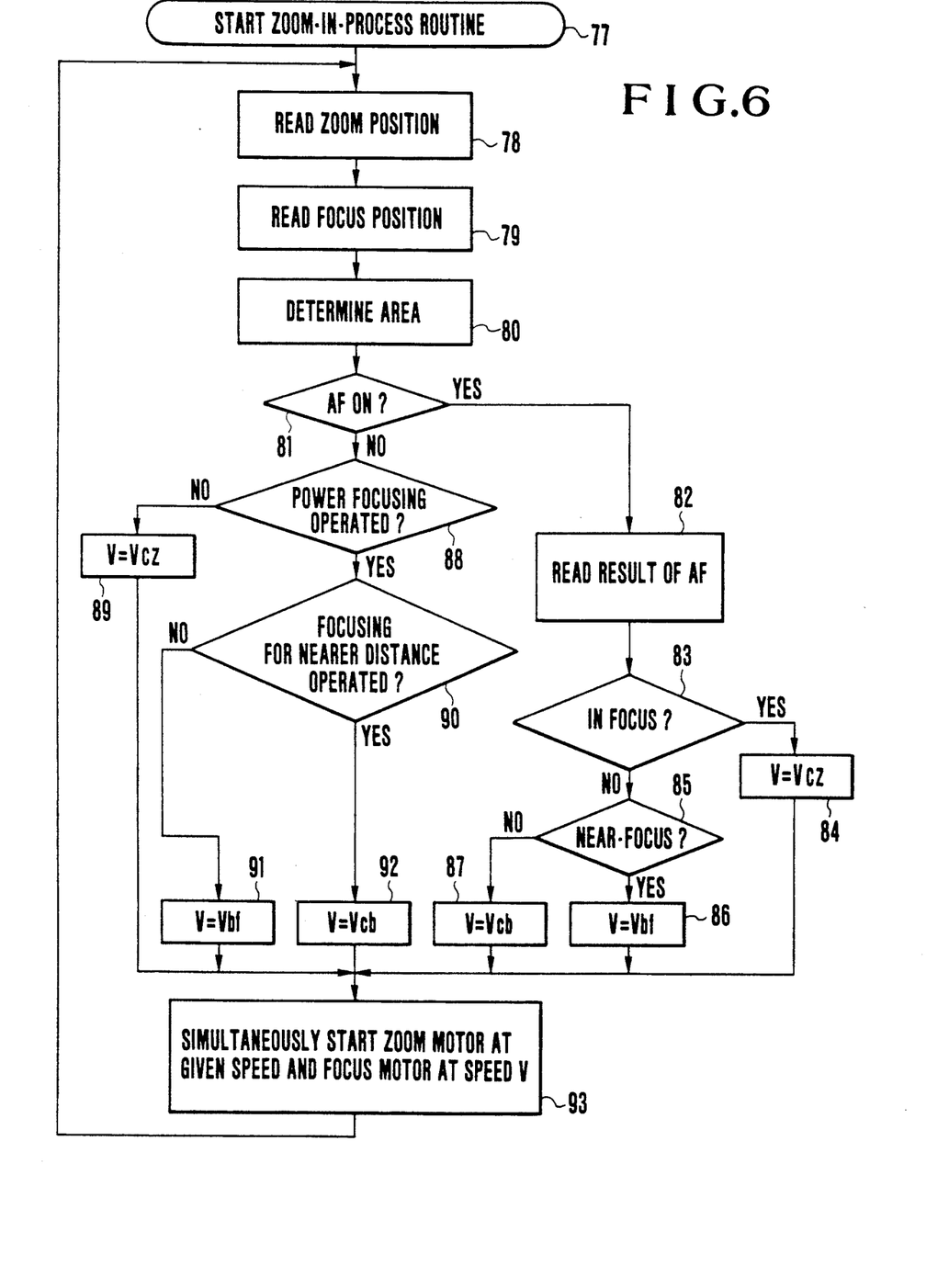
FIG. 6 is a flow chart showing the operation of a fifth embodiment of the invention.

Next, a fifth embodiment of the invention is described as follows: Different speeds 167, 168 and 169 are set in each of the small areas as shown in FIG. 13. Among these speeds, the speed 168 at which the circle of confusion changes little is called a speed Vcz; the speed at which a focusing distance changes toward a nearer distance is called a speed Vcb; and the speed at which the focusing distance changes toward a farther distance is called a speed Vbf. Each of the speeds Vcb and Vbf corresponds either to the speed 167 or to the speed 169 of FIG. 13 according to the direction of zooming. One of these speeds is selectively used when the power focusing operation is performed during the process of zooming with the AF device in an inoperative state. The flow of this operation is described below with reference to FIG. 6:

Referring to FIG. 6, a zoom-in-process routine starts at a step 77. At a step 78: The position of the variator lens is read. At a step 79: The position of the focus lens is read. At a step 80: An area is determined.

At a step 81: A check is made to find if the AF device is on. If so, the flow comes to a step 82 to read the result of focus detection. At a step 83: A check is made to find if the result of focus detection is an in-focus state. If so, the flow comes to a step 84. At the step 84: The driving speed V is set at the speed Vcz. In the event of defocus, the flow comes to a step 85 to find the direction of blur by making a discrimination between a near-focus state and a far-focus state. In the case of a near-focus state, the flow comes to a step 86 to set the driving speed V at the speed Vbf. In the event of a far-focus state, the flow comes to a step 87 to set the driving speed V at the speed Vcb.

If the AF device is found to be off at the step 81, the flow comes to a step 88. At the step 88: A check is made to find if a power focusing operation is performed. If not, the flow comes to a step 89 to set the driving speed V at the speed Vcz. If the power focusing operation is performed, the flow comes to a step 90 to make a check for the direction of the power focusing operation. The flow comes to a step 91 or 92 according to the result of the check made at the step 90. At the step 91 or 92: The driving speed V is set at the speed Vbf or at the speed Vcb. At a step 93: Both the zoom and focus motors are simultaneously started.

Each of a plurality of embodiments described in the foregoing comprises a first lens group which is arranged to be driven to change its position along the optical axis for varying the power of the zoom lens; a second lens group which is arranged to be driven along the optical axis for focusing and also for maintaining an image forming position during the power varying process; first driving means for driving the first lens group; second driving means for driving the second lens group; automatic focus detecting means; and a control part for controlling the first and second driving means during the process of zooming on the basis of the results of detection of the positions of the first and second lens groups and the results of detection made by the automatic focus detecting means. The control part is arranged to perform control in such a way as to vary the driving manner of the second driving means according to whether or not the optical system is in the process of zooming when an instruction is given to move the second lens group while the automatic focus detecting means is in an inoperative state. Therefore, a focusing action can be carried out in a correct direction without causing any blurred, defocus state even during the process of zooming. The invention, therefore, can be advantageously applied to the lens position control device of a video camera using an inner focus type zoom lens.

What is claimed is:

1. An optical apparatus comprising:
   a) a first lens arranged to be movable along an optical axis for a power varying action;
   b) a second lens arranged to be movable along the optical axis for focusing and also for compensation during the power varying action;
   c) position detecting means for detecting positions of said first and second lenses;
   d) focus detecting means; and
   e) control means for controlling a movement of said second lens on the basis of information obtained from said position detecting means and said focus detecting means when the power varying action is performed, said control means being arranged to vary a manner of control over the movement of said second lens according to whether or not the power varying action is in process in a case where said second lens is to be forcibly moved while said focus detecting means is in an inoperative state.

2. An apparatus according to claim 1, wherein said control means is arranged to correct a speed of the movement of said second lens set on the basis of the information obtained from said position detecting means when said focus detecting means is in an inoperative state.

3. An apparatus according to claim 2, wherein said second lens is arranged to be driven by a motor, and wherein said control means is arranged to control a rotation speed of said motor.

4. An apparatus according to claim 3, wherein said control means is arranged to make the rotation speed of said motor which drives said first lens substantially constant.

5. An apparatus according to claim 1, wherein said control means is arranged to read from memory means a speed of the movement of said second lens set on the basis of the information obtained from said position detecting means and, when said focus detecting means is in operation, to correct said speed of the movement of said second lens on the basis of information on the result of focus detection made by said focus detecting means.

6. An apparatus according to claim 5, wherein said control means is arranged to correct said speed of the movement of said second lens so as to be increased or decreased according to the direction in which said second lens is forcibly moved when said focus detecting means is in an inoperative state.

7. An apparatus according to claim 6, wherein said second lens is arranged to be driven by a motor, and wherein said control means is arranged to control a rotation speed of said motor.

8. An apparatus according to claim 5, wherein said second lens is arranged to be driven by a motor, and wherein said control means is arranged to control a rotation speed of said motor.

9. An apparatus according to claim 1, wherein said first and second lenses are individually driven by respective motors, and wherein said control means is arranged to control rotation speeds of said motors.

10. An optical apparatus comprising:
    a) a first lens arranged to be movable along an optical axis for a power varying action;
    b) a second lens arranged to be movable along the optical axis for focusing and also for compensation during the power varying action;
    c) position detecting means for detecting positions of said first and second lenses;
    d) focus detecting means;
    e) a manual operation member for a manual focusing operation;
    f) a first motor serving as a drive source for moving said first lens;
    g) a second motor serving as a drive source for moving said second lens; and
    h) control means for controlling a movement of said second lens by driving and controlling said second motor on the basis of information obtained from said position detecting means and said focus detecting means when the power varying action is performed to move said first lens by driving said first motor, said control means being arranged to drive and control said second motor according to a preset movement information on the basis of information obtained from said position detecting means when said first motor is driven while said focus detecting means is in an inoperative state, and to drive and control said second motor by correcting said movement information when said manual operation member is operated in driving said first motor while said focus detecting means is in an inoperative state.

11. An apparatus according to claim 10, wherein said control means is arranged to read a preset moving speed of said second lens from memory means on the basis of information obtained from said position detecting means and to cause said second lens to be moved at a speed obtained by correcting said moving speed when said manual operation member is operated while said focus detecting means is in an inoperative state.

12. An apparatus according to claim 11, wherein said control means is arranged to cause said second lens to be moved at a speed obtained by correcting said moving speed when said manual operation member is operated while said focus detecting means is in an inoperative state.

13. An apparatus according to claim 12, wherein said moving speed is corrected by using information stored in said memory means.

14. An apparatus according to claim 11, wherein said moving speed is corrected by using information stored in said memory means.

15. An apparatus according to claim 10, wherein said control means is arranged to obtain, from information stored in memory means, a preset moving position to which said second lens is to be moved on the basis of information obtained from said position detecting means.

16. An apparatus according to claim 15, wherein said control means is arranged to obtain a moving speed of said second lens on the basis of said preset moving position and to correct said moving speed on the basis of focus information when said focus detecting means is in operation.

17. An apparatus according to claim 16, wherein said control means is arranged to cause said second lens to be moved at a speed obtained by correcting said moving speed when said manual operation member is operated while said focus detecting means is in an inoperative state.

18. An apparatus according to claim 10, wherein said movement information is corrected by using information stored in memory means.

* * * * *